Oct. 8, 1963  R. T. LEITNER ETAL  3,106,599
EXPANSIBLE CONNECTOR FOR RIGID COAXIAL TRANSMISSION LINE
Filed Nov. 10, 1961  2 Sheets-Sheet 1

INVENTORS
ROBERT T. LEITNER
ANDREW H. STRAKA
BY
John J. Logan
ATTORNEY

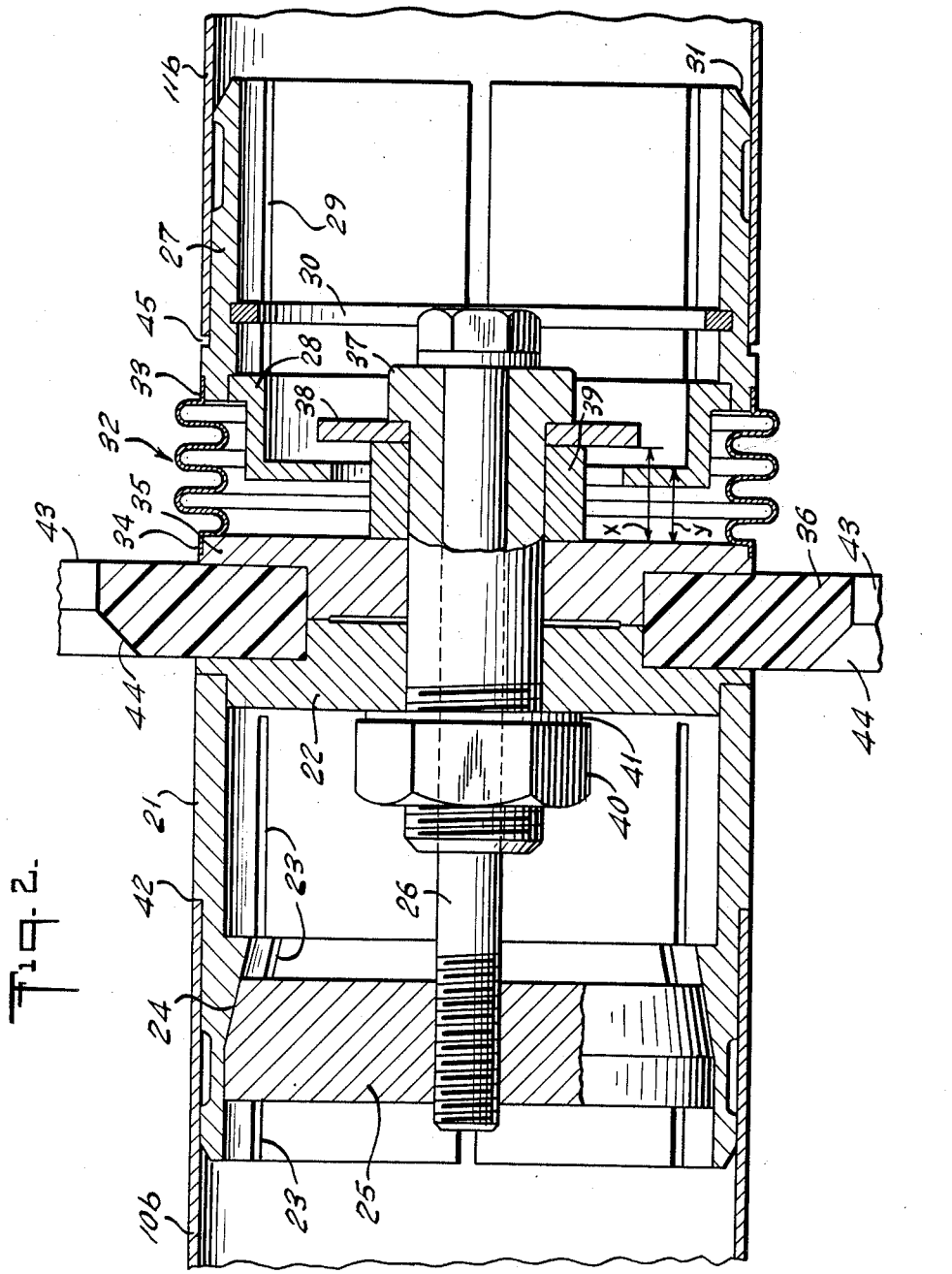

United States Patent Office 3,106,599
Patented Oct. 8, 1963

3,106,599
EXPANSIBLE CONNECTOR FOR RIGID COAXIAL TRANSMISSION LINE
Robert T. Leitner and Andrew H. Straka, Sherburne, N.Y., assignors to Technical Appliance Corporation, Sherburne, N.Y., a corporation of Delaware
Filed Nov. 10, 1961, Ser. No. 151,513
4 Claims. (Cl. 174—12)

This invention relates to wave transmission lines and more especially it relates to lines of the coaxial kind which are subject to wide temperature differentials between the inner and outer conductors.

A principal object is to improve such lines by avoiding the mechanical "slippage" noise which usually accompanies differential expansion as between the inner and outer conductors.

Another object is to provide a rigid coaxial line for high power wave transmission systems which is assembled in successive sections, and with the sections coupled by means which can be expeditiously assembled and at the same time avoids the wear and "slippage noise" usually resulting from differential expansion.

A feature of the invention relates to a novel coupling assembly for plural-section rigid coaxial lines whereby such sections can be expeditiously united and without introducing undesirable impedance variations at the united sections, and at the same time avoiding slippage noise usually resulting from differential expansion.

Another feature relates to a coupling assembly for plural-section rigid coaxial transmission lines, which assembly is frictionally united to one of sections of the line and which assembly in itself is provided with a flexibly expanding element such as sylphon or bellows to enable the coupled sections to expand and contract without changing the wave characteristics of the line.

A further feature relates to the novel organization, arrangement and relative location and interconnection of parts whereby a more efficient rigid coaxial high power sectionalized wave transmission line is obtained.

Other features and advantages not specifically enumerated will be apparent after a consideration of the following detailed descriptions, the attached drawing and the appended claims.

In the drawing which shows, by way of example, one preferred embodiment,

FIG. 2 is a sectional view of FIG. 1 taken along the line 2—2 thereof and viewed in the direction of the arrows;

Figure 1:
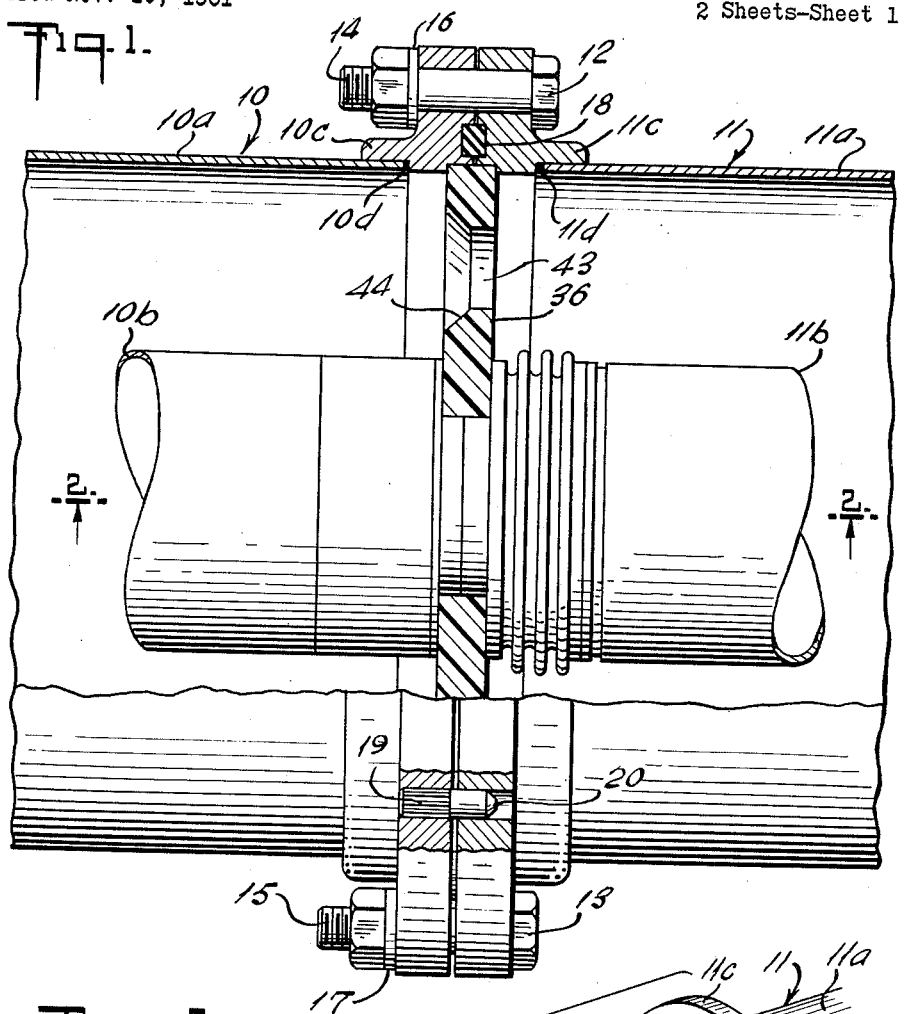
FIG. 1 is a sectional view of part of a plural-section coaxial line embodying features of the invention.
Figure 3:
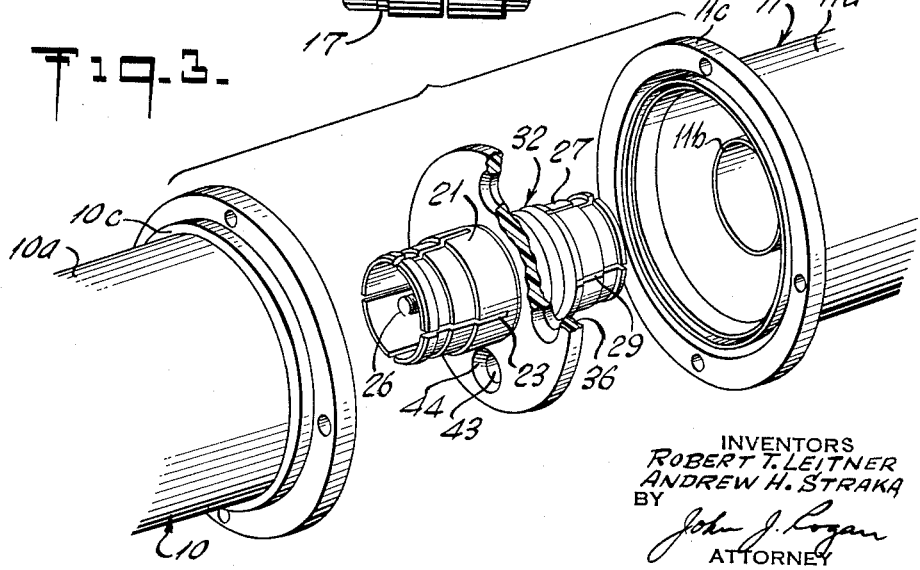
FIG. 3 is a perspective exploded view of the line sections with the intervening coupling assembly.

One of the problems encountered in rigid coaxial lines for high power wave transmission systems is the existence of irregularities or disturbances that appear as a result of temperature differential between the inner and outer conductors. Another problem is to enable the various sections of a plural-section line to be coupled expeditiously and without danger of introducing undesirable impedance relations at the joined ends. These problems are especially troublesome in so-called long-run lines where each section may have a length of twenty-five or thirty feet and the outer conductor may have an outside diameter for example of six inches and the inner conductor may have an outside diameter of two inches. Furthermore, the coupling unit should not require any special welding, soldering or brazing operations which are expensive, time consuming and may tend to distort the dimensional configuration of either or both of the conductors at the coupled region. It is clear, therefore, that with such long and massive line sections, the problem of differential expansion of the inner conductor relative to the outer conductor is one which must be taken care of. Heretofore reliance has been placed upon a frictional sliding fit between the telescoped or coupled ends of the inner conductor. In such arrangements, as the two telescoped parts must slide on each other during the changes in temperature, there result two disturbing conditions. One of these is an electrical condition which introduces what may be termed "slippage noise" in the transmitted waves; the other is what is known as a galling action between the slipping surfaces and which may result in the loosening and collection of metal particles, increasing the liability of arcing within the line and ultimate breakdown. The primary function of the coupling assembly according to the invention is to provide a continuous radio frequency connection between the adjacent sections of the center conductor. This connection must be reasonably free from electrical discontinuities which would give rise to reflected energy and associated standing waves on the line, usually on the inner conductor of such line. This is especially true if the line is of the high power kind and if the inner conductor operates in an altogether different temperature environment as compared with the outer conductor. Therefore, it is necessary to make allowance for relative differentials in thermal expansion and contraction as between the inner and outer conductors. In cases where the line is carrying relatively high power, as in the case of antenna feeding, it is not uncommon for the center conductor to be operating as much as 70 degrees F. or higher than the outer conductor. In any case it is imperative to have the line free from noise generation which tends to result from such differential temperature conditions. In the conventional arrangement, reliance is placed upon the relative longitudinal slippage between the telescoped ends of the two sections to be coupled. However, such slippage gives rise to noise, which is particularly disturbing in receiving systems, and the abrasive slipping action results in metal shavings which are deposited in the line. According to the invention, the line sections are coupled by an intervening section which compensates for the different temperature conditions by means of physical movement but without mechanical slippage of telescoped ends.

Referring to FIG. 1, the numerals 10 and 11 represent the adjacent ends of two conventional coaxial line sections, each section consisting of a respective cylindrical outer conductor 10a, 11a, and a respective cylindrical inner conductor 10b, 11b. In the conventional way, the inner and outer conductors of each section are held in concentric spaced relation throughout their lengths by suitable rods or beads of insulation (not shown). In order that the outer conductors may be rigidly connected, they are usually provided with integral flanges 10c, 11c, each of which is welded or brazed to its outer conductor for example at the regions 10d, 11d. These flanges may be in the form of metal rings having an internal diameter, except for the shouldered part overlying the outer surface of the associated conductor, which is the same as the internal diameter of that outer conductor.

The flanged sections are arranged to be fastened in sealed abutting relation by a series of bolts 12, 13, etc., and nuts 14, 15, etc., with suitable intervening lock washers 16, 17, etc. These flanged joints are also provided with an intervening sealing compressible ring 18 of rubber, "neoprene," or the like. Mechanical alignment of the two flanged ends is assured by a pin 19 which may be rigidly carried by one flange and having a projecting portion for registry with a corresponding bore 20 in the opposite flange. It will be understood, of course, that this manner of uniting the outer conductors is merely typical, and it will be understood that the joining of the outer conductors is not effective until the inner conductors 10b, 11b are united according to the invention.

Referring more particularly to FIG. 2, a description will now be given of the manner of uniting the inner conductors 10b, 11b. Arranged to be telescoped into the open end of the inner conductor 10b is an assembly consisting of the shouldered tubular metal sleeve 21 to which is brazed an annular ring portion or block 22. The left hand part of sleeve 21 is of reduced outer diameter to accommodate the conductor 10b so that the outer surface of the conductor 10b and the sleeve 21 are free from any discontinuities. The periphery of sleeve 21 is provided with a series of slits 23, whereby the sleeve can be expanded radially outward so as to securely lock the sleeve within the conductor 10b to prevent any slippage therebetween. For the purpose of this expansive locking, sleeve 21 may have an inclined internal portion 24 which is adapted to be engaged by the expansion nut 25 threaded on to the bolt 26 so that as the said bolt is turned it draws the nut 25 toward the left and, since the said nut has a complementary inclined portion to that of sleeve portion 24, such motion of the nut 25 expands the sleeve tightly against the inner surface of line section 10b. The coupling also includes another coupling assembly consisting of a shouldered metal sleeve 27 which is welded or brazed to a metal ring 28. Sleeve 27 is provided with longitudinally extending slits whereby it can be expanded outwardly against the inner surface of the line conductor 11b. However, this expansion is effected by a split expansion ring 30 which is fitted within a recess interiorly of sleeve 27. The expansive force of spring 30 is such that for the maximum range of temperature variation of the conductor 11b there is no slippage between the sleeve 27 and the said conductor, although the sleeve 27 can, by reason of the inclined forward edge 31, be mechanically forced into the conductor 11b during assembly of the line sections. Brazed or welded to the left hand end of sleeve 27 is a metal bellows 32. This bellows has at its right hand end an integral cylindrical flange 33 which fits over a corresponding shoulder on the sleeve 27 to which it may be brazed or welded. Likewise the left hand end of bellows 32 is provided with an integral cylindrical flange 34 which is welded or brazed to a corresponding shoulder on a metal ring or block 35. Ring 35 is of the same outer and inner diameters as the ring 22 above described. The rings 22 and 35 are adapted to be fastened in abutting face relation so as to clamp between their outer portions a suitable bead or ring 36 of insulating material preferably polytetrafluoroethylene as sold under the trademark "Teflon." For the purpose of holding the two parts of the coupling together and thus rigidly uniting the conductors 10b and 11b, there is provided a hollow bolt 37 which has a mechanically limiting stop washer 38 seated against a shoulder on bolt 37. Surrounding the bolt 37 is a metal spacer sleeve 39 which abuts against the ring 35 and the washer 38. The left hand end of bolt 37 is threaded and is provided with a suitable threaded nut 40 and intervening metal lock washer 41. Thus, by tightening up on nut 40, the two parts of the coupling assembly are rigidly united.

Passing through the hollow bolt 37 is the above described bolt 26 whose function is to tighten up on the expanding nut 25 so as to rigidly fasten the sleeve 21 within the line conductor 10b. We have discovered that in order to obtain the desired low voltage standing wave ratio, it is necessary that the hills and valleys of the bellows 32 should be equal in number. Thus, as shown in the drawing, the bellows has three valleys and three hills. It will be understood, of course, that the bellows may be provided with a smaller or greater number of expansible corrugations providing the number of valleys equals the number of hills in the corrugations. Thus, the elements 21 through 41 constitute a unitary coupling assembly whereby the two line sections 10b, 11b can be rigidly united. The manner of locking the parts of that coupling assembly together will be clear from the above description and the drawing.

In connecting the two line sections 10b, 11b together, the coupling assembly has its left hand end inserted into the line conductor 10b with the bellows or right hand section of that coupling assembly extending, of course, beyond the end of line 10b. With the locking bolt 26 backed off somewhat, the connector assembly should telescope within the line conductor 10b until the shoulder 42 engages the end of the line conductor. Bolt 26 is then tightened to a predetermined torque so as to lock the coupling assembly tightly within the conductor 10b. In order to observe properly that the shouldered portion 42 closely abuts against the end of the line during this operation, the insulator ring 36 is provided with one or more windows 43 having a tapered portion 44 to permit the telescoped parts 21 and 10b to be visually observed.

The coupling assembly is now ready for insertion into the other line section 11b. The right hand end of the coupling assembly is forced into the line section 11b, and as above pointed out the radial force of ring 30 is such as to provide a tight fit between the sleeve 27 and line conductor 11b which slightly overcomes the resistance of the bellows. In fact, therefore, by reason of the frictional tight fit between sleeve 27 and the line conductor 11b, as the line conductor expands it is practically the same as if the line conductor were rigidly fastened to the sleeve over the maximum range of temperature variations which the conductor 11b encounters. Therefore, as the line conductor 11b expands or contracts, it merely expands or contracts the bellows 32 without producing any frictional slip between the sleeve 27 and the conductor 11b. Preferably, a small tolerance length or space 45 is provided between the shouldered portion on sleeve 27 and the end of the line conductor 11b. During the first extreme temperature cycle to which the conductor 11b is subjected, the dimension 45 adjusts itself automatically, after which the bellows 32 is free to take up differential length changes over a range defined by (X—Y) as limited by the mechanical stoppage between the surfaces of items 35, 27, 38.

From the foregoing it will be seen that it is possible to couple two line sections together without using any welding or brazing and without introducing any telescopic slippage between the line conductors and the coupling sleeves. The invention is not limited to the particular dimensions mentioned herein and is applicable to coaxial lines of widely different dimensions. The coupling arrangement also has the advantage that it is completely interchangeable with Military and Electronic Industry Association standard interconnectors. The exact configuration of the bellows is such as to minimize electrical discontinuities due to its presence. It was found that with the bellows structures, the effective reflection coefficient of each bellows was 0.0016 which is equivalent to a voltage standing wave ratio of 1.0032 per bellows.

Various changes and modifications may be made in the disclosed embodiment without departing from the spirit and scope of the invention.

What is claimed is:

1. A coupling assembly for uniting the tubular center conductors of two coaxial line sections, comprising a pair of annular blocks, one of said blocks having a cylindrical flange fastened thereto, said cylindrical flange terminating in a radially expansible portion for telescoping within the center conductor of one of said line sections, a cylindrical sleeve terminating at one end in a radially expansible portion for telescoping into the center conductor of the other line section, an expansible metal bellows connecting said sleeve to the other of said blocks, said sleeve arranged to frictionally engage the inner surface of said other center conductor with a predetermined force whereby longitudinal expansion of said center conductor results merely in compression of said bellows.

2. A coupling assembly according to claim 1 in which means are provided for clamping said annular blocks in rigid abutting contact.

3. A coupling assembly according to claim 1 in which means is provided for clamping said annular blocks in rigid abutting contact and an adjustable shaft passes through both blocks and is threaded at one end to a bushing which engages the inner surface of said cylindrical flange to lock the coupling assembly in telescoped relation in one of said line sections, and said sleeve carries interiorly thereof a split pressure ring for pressing it into radial engagement with the corresponding center conductor of the associated line section.

4. A coupling assembly according to claim 3 in which an insulator spacer member is clamped between said abutting annular blocks to hold the center conductors centrally within a surrounding outer conductor.

References Cited in the file of this patent

FOREIGN PATENTS 959,202     Germany ---------------- Apr. 4, 1957